(12) United States Patent
Weston

(10) Patent No.: US 12,736,430 B2
(45) Date of Patent: Sep. 15, 2026

(54) SWIMMING POOL LIGHT AND DRAIN LEAK DETECTION DEVICES

(71) Applicant: Nathan Weston, Bonita Springs, FL (US)

(72) Inventor: Nathan Weston, Bonita Springs, FL (US)

( * ) Notice: Subject to any disclaimer, the term of this patent is extended or adjusted under 35 U.S.C. 154(b) by 248 days.

(21) Appl. No.: 18/809,446

(22) Filed: Aug. 20, 2024

(65) Prior Publication Data

US 2026/0056077 A1 Feb. 26, 2026

(51) Int. Cl.
*G01M 3/04* (2006.01)
*G01M 3/20* (2006.01)
*G01M 3/24* (2006.01)

(52) U.S. Cl.
CPC ................ *G01M 3/04* (2013.01); *G01M 3/20* (2013.01); *G01M 3/24* (2013.01)

(58) Field of Classification Search
CPC ............. G01M 3/04; G01M 3/20; G01M 3/24
See application file for complete search history.

(56) References Cited

U.S. PATENT DOCUMENTS

| | | | | |
|---|---|---|---|---|
| 5,734,096 A * | 3/1998 | McGuigan | G01M 3/02 73/49.2 |
| 9,128,002 B2 * | 9/2015 | Marino | G01M 3/32 |
| 9,945,754 B2 * | 4/2018 | Lenart | E04H 4/148 |
| 10,036,682 B2 * | 7/2018 | Lenart | G01M 3/20 |
| 2017/0167944 A1 * | 6/2017 | Lenart | G01M 3/226 |
| 2017/0284888 A1 * | 10/2017 | Lenart | G01M 3/20 |
| 2020/0141830 A1 * | 5/2020 | Marino | G01M 3/02 |

* cited by examiner

*Primary Examiner* — Nathaniel J Kolb
(74) *Attorney, Agent, or Firm* — Mark G. Johnson; Johnson | Dalal

(57) ABSTRACT

Swimming pool light and drain leak detection devices are described. The swimming pool light leak detection device can include a single piece cover formed of a flexible material and having a semi-rigid upper section with reinforcing ribs, an integrated suction cup, a suction cup vacuum release hose and plug, a flexible accordion bellows section, a double lip ring seal, a dye testing hose with funnel, handle connection members, and circular apertures. A swimming pool drain leak detection device including a single piece cover formed of a flexible material having a semi-rigid upper section, reinforcing ribs, a double lip seal, a flexible accordion bellows section disposed between the semi-rigid upper section and the double lip seal, handle connection members, a pool pole handle, a dye testing hose, circular apertures, lead weight cavities, a tandem wire handle connection, and a ring seat formed on an interior surface.

20 Claims, 20 Drawing Sheets

C

SWIMMING POOL LIGHT AND DRAIN LEAK DETECTION DEVICES

FIELD

Some implementations relate generally to swimming pool leak detection devices, and, more particularly, to swimming pool light and drain leak detection devices having single piece covers.

BACKGROUND

Some conventional swimming pool light and drain leak detection devices may suffer from one or more limitations. For example, some conventional swimming pool light leak detection devices include a rigid cover and a flexible seal attached to the cover. This flexible seal is often a bicycle inner tube glued to a hard plastic dome designed to fit over an existing pool light housing. Because the pool walls and lights are built with great deviation, adjustment of the hard dome is necessary, so the dome is secured to the glass light lens with a suction cup at the end of a long, threaded rod. The threads of the rod allow a bolt that adjusts the distance and fit of the dome, so the dome remains fixated at an ideal distance to the glass lens.

Embodiments were conceived in light of the above-mentioned problems and limitations, among other things. The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

DETAILED DESCRIPTION

Figure 1:
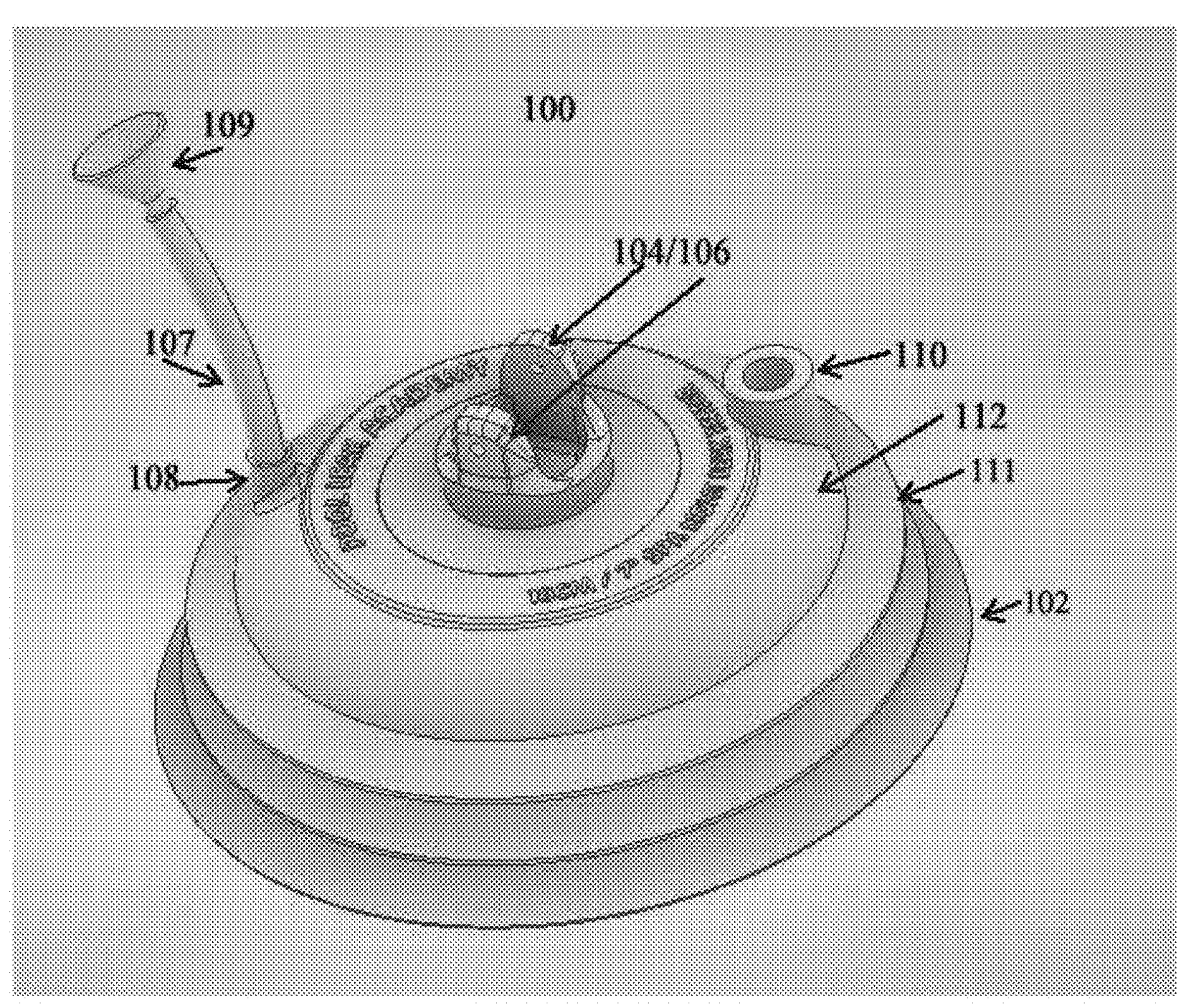
FIG. 1 is a diagram showing an overall view of an example single piece cover of a swimming pool light or drain leak detection device in accordance with some implementations.
Figure 2:
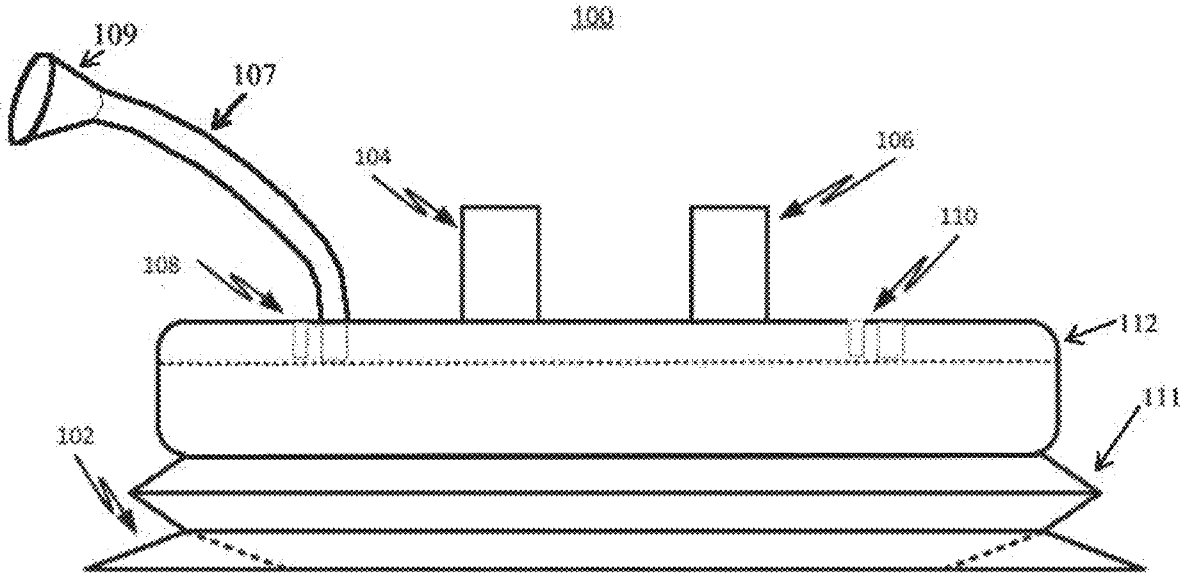
FIG. 2 is a diagram showing a side view of an example single piece cover of a swimming pool light or drain leak detection device in accordance with some implementations.

FIGS. 1 and 2 are diagrams showing a perspective and side view of an example single piece light leak tester 100 of a swimming pool light or drain leak detection device in accordance with some implementations. The single piece light leak tester 100 can be formed of an elastomeric material such as silicon or the like. The single piece light leak tester 100 includes a double lip perimeter ring seal 102, flexible accordion bellows 111, semi-rigid upper section 112, handle connection points 104/106, cylindrical apertures 108 (e.g., for dye testing tube)/110 (e.g., for hydrophone).

The single piece light leak tester 100 has an aperture 108 for a flexible tube 107 to accept a tracer dye from a dye funnel 109 for the testing of leaks in a light or bottom drain.

Figure 3:
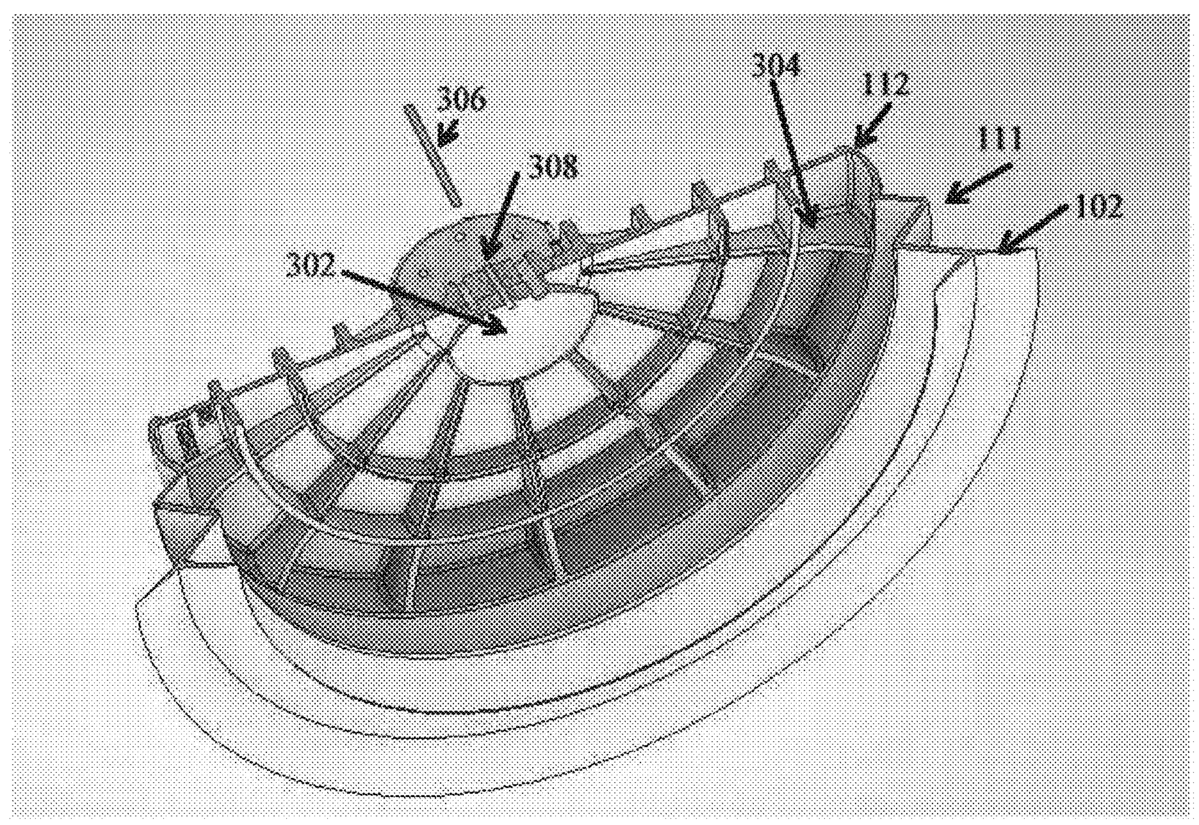
FIG. 3 is a diagram showing a cutaway view of an example single piece cover of a swimming pool light or drain leak detection device in accordance with some implementations.

FIG. 3 is a diagram showing a cut away bottom view of the example single piece light leak tester 100 of a swimming pool light or drain leak detection device showing an integrated suction cup 302, a plurality of reinforcing ribs 304, a suction cup vacuum release pin 306, and a suction cup vacuum release aperture 308.

Figure 4:
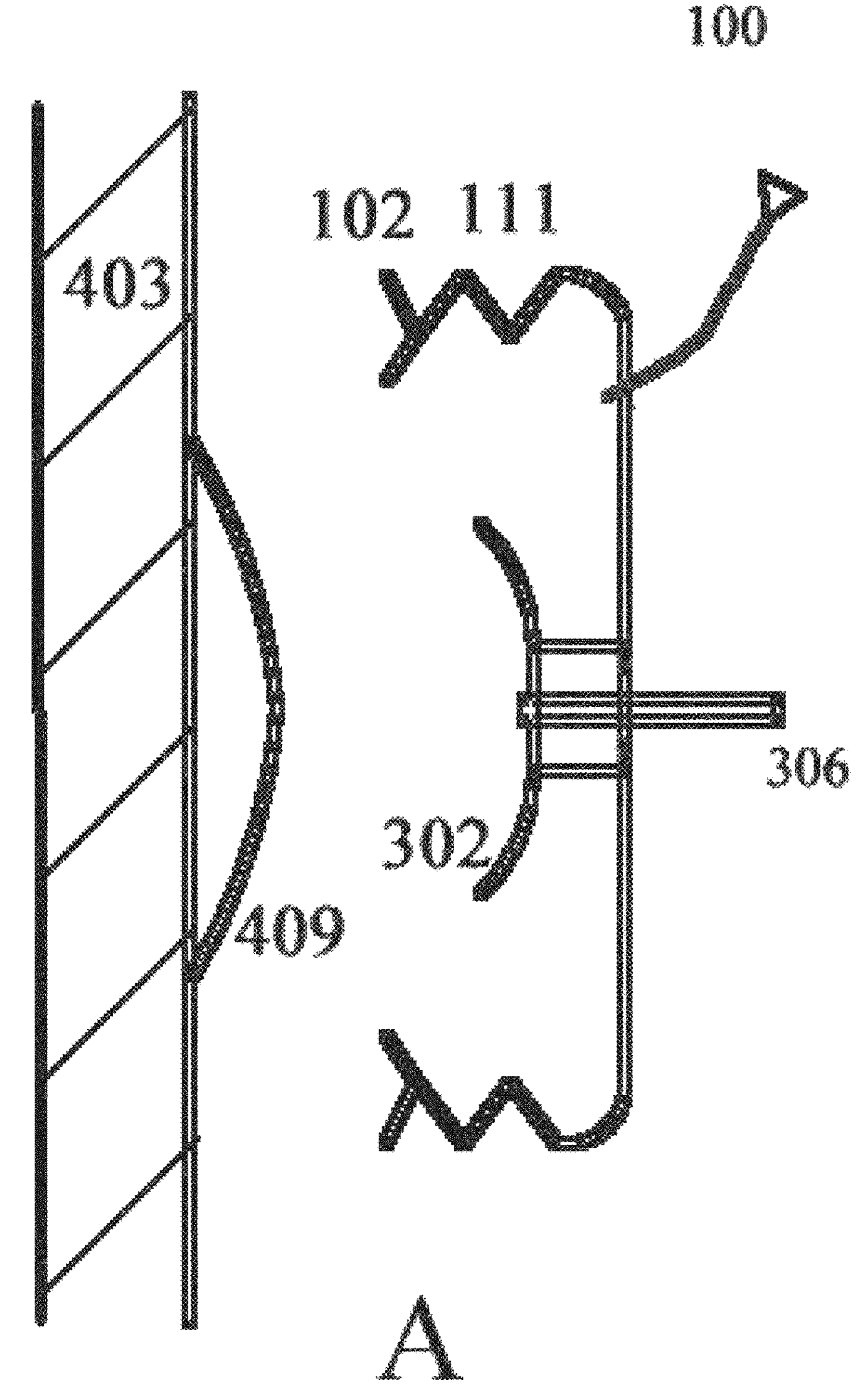
FIG. 4 is a diagram showing aa side operational view (A) of an example swimming pool light leak detection device with an integrated suction cup in accordance with some implementations.
Figure 5:
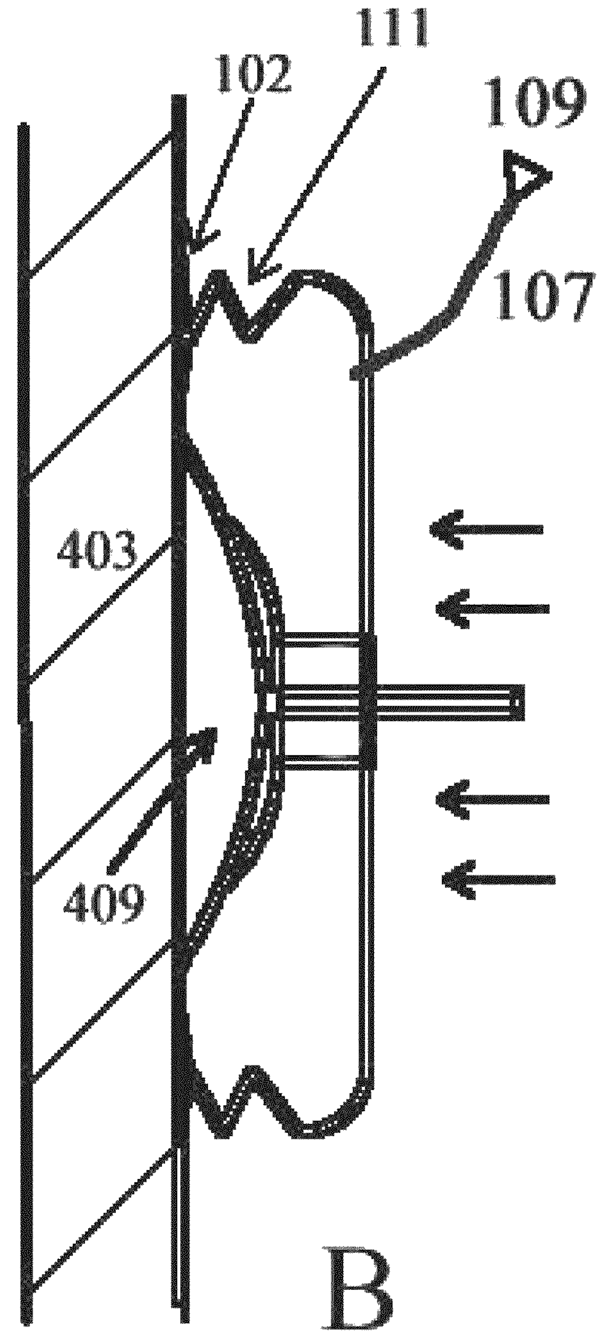
FIG. 5 is a diagram showing a side operational view (B) of an example swimming pool light leak detection device with an integrated suction cup in accordance with some implementations.
Figure 6:
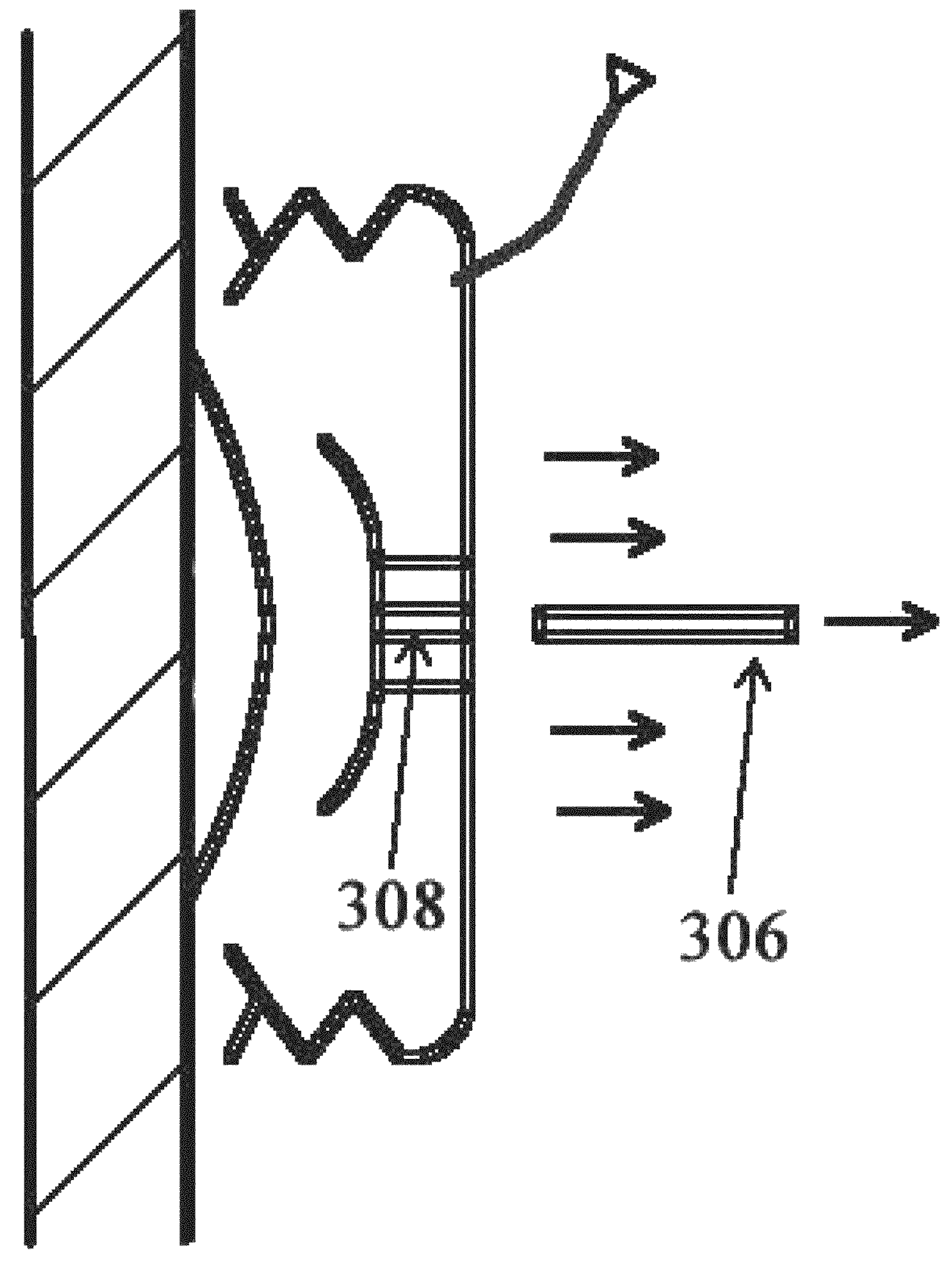
FIG. 6 is a diagram showing a side operational view (C) of an example swimming pool light leak detection device in which the single piece cover includes an integrated suction cup in accordance with some implementations.

FIGS. 4-6 show an operational sequence of the single piece light leak tester 100. FIG. 4 is a diagram showing an operational diagram (A) showing a side view of an example swimming pool light leak detection device 100 in accordance with some implementations as the suction cup 302 is pressed against the glass lens 409, the double lip perimeter seal 102 will fit flat against the pool wall 403 and the flexible accordion seal 111 will adjust the distance between the single piece light leak tester 100 and the pool wall 403. In operation, the suction cup can be affixed to the glass lens of a swimming pool light 409 to help the single piece cover 100 be secured against the swimming pool light or leak detection. When the operator desires to release the suction cup 302 from the swimming pool light 409, the operator can simply remove the suction cup vacuum release pin 306 to permit the vacuum to be released through the suction cup vacuum release aperture 308.

FIG. 5 is an operational diagram (B) showing a side view of a compressed single piece light leak tester 100 and suction cup 302 against light lens 409 sealing the double lip perimeter seal 102 against the pool wall 403 forming a watertight seal between the two. The suction cup 302 is also compressed and conforms to the dome shape of the light lens 409 and becomes generally immovable or nearly so for leak testing purposes. In this compressed position, dye can be introduced to identify a flow into the funnel 109 and dye testing tube 107, which can indicate a leak.

FIG. 6 is an operational diagram (C) showing a side view of an example swimming pool light leak detection device in which the suction cup 302 is released from the light lens 409 by the removal of the suction cup vacuum release pin 306 from the suction cup vacuum release aperture 308, which, in turn, releases the single piece light tester 100 from the wall 403 of the pool.

Figure 7:
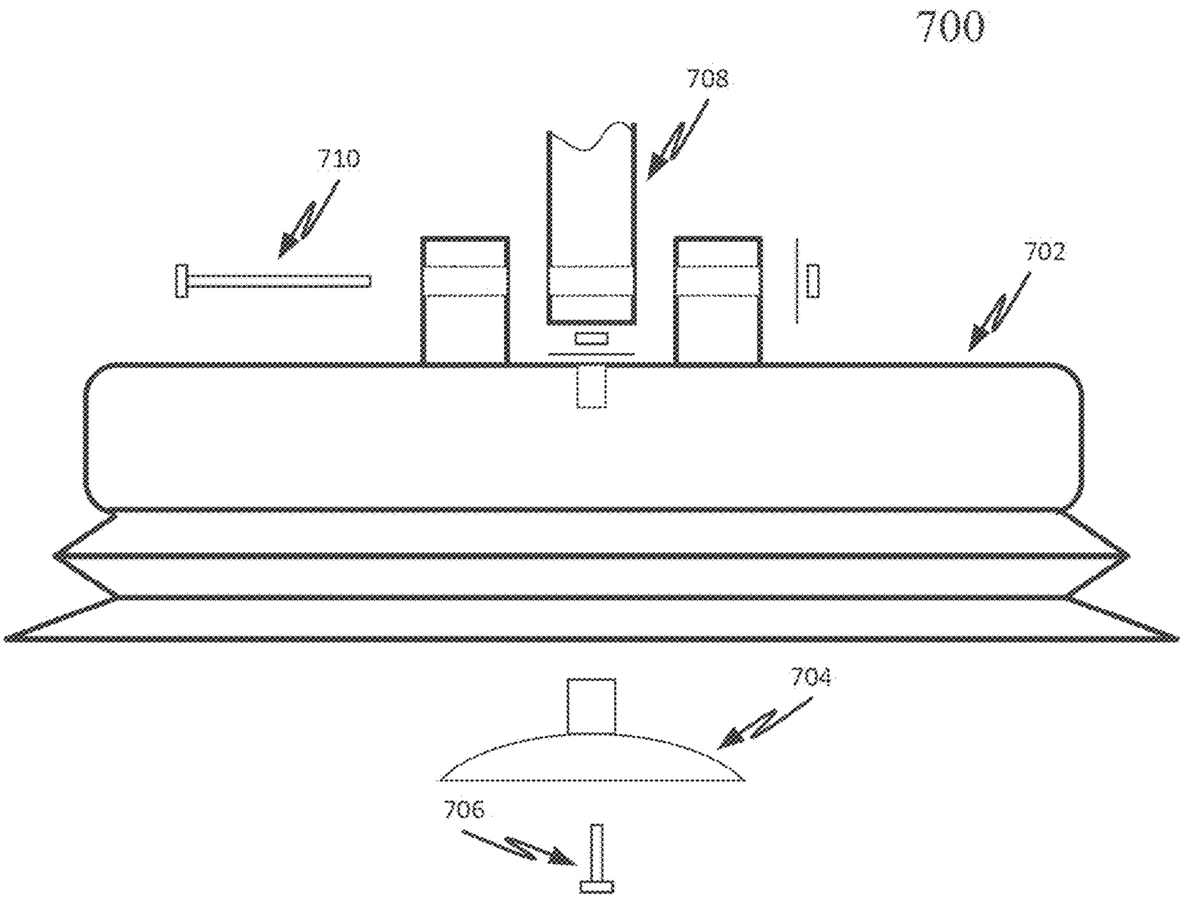
FIG. 7 is a diagram showing an exploded view of an example swimming pool light leak detection device in which the single piece cover includes a fastened suction cup in accordance with some implementations.

FIG. 7 is a diagram showing an exploded view of an example swimming pool light leak detection device 700 in which the single piece cover 702 includes a mechanically fastened suction cup 704 attached, in this example, with a nut and bolt 706. FIG. 7 also shows a handle 708 and a fastener 710 (e.g., long bolt and nut).

Figure 8:
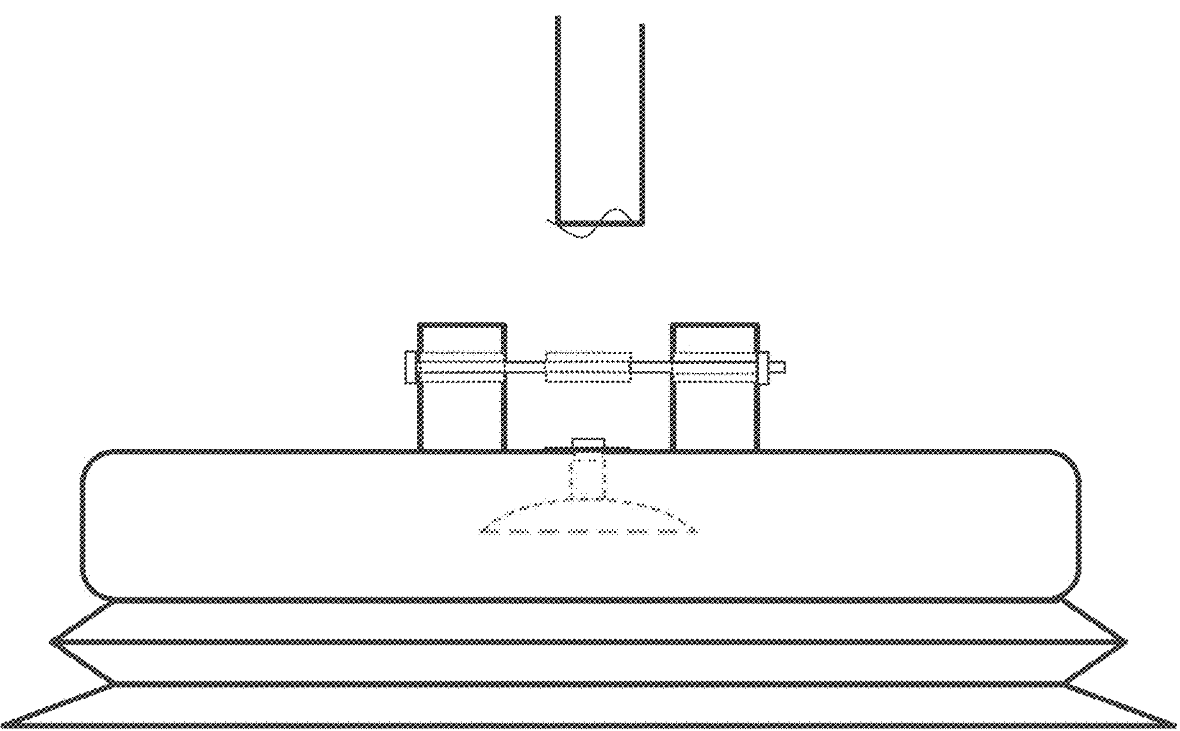
FIG. 8 is a diagram showing an example exploded assembly of an example swimming pool light leak detection device in which the single piece cover includes a fastened suction cup in accordance with some implementations.

FIG. 8 is a diagram showing an assembled view of the fastened suction cup withs parts matching those described for FIG. 7.

Figure 9:
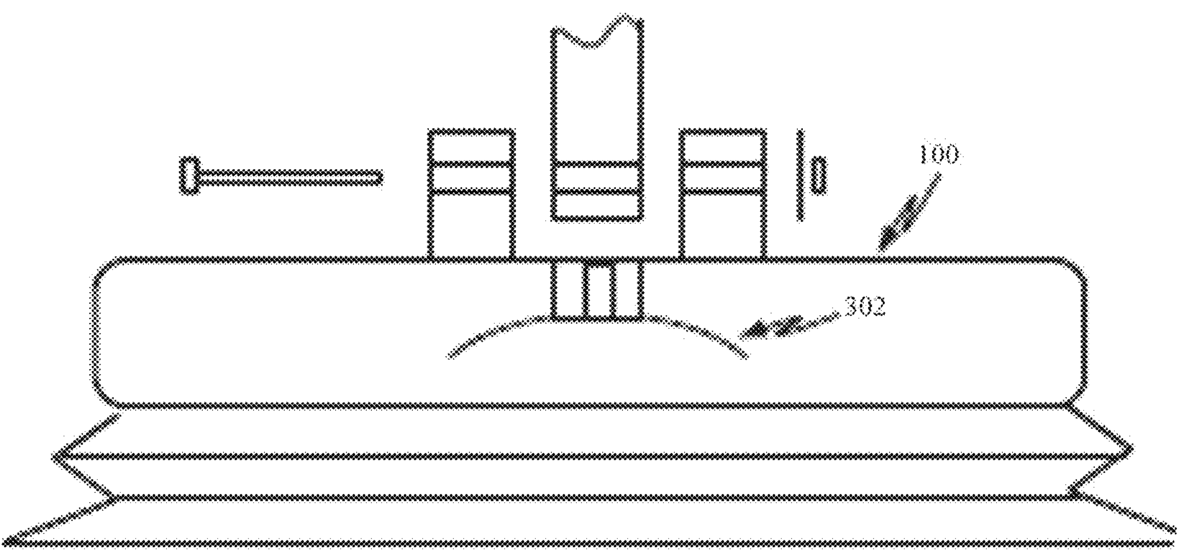
FIG. 9 is a diagram showing the exploded view of a swimming pool light leak detection device in which the single piece cover includes an integrated suction cup in accordance with some implementations.

FIG. 9 is a side view of the integrated suction cup 302 with the single piece cover 100 in accordance with some implementations.

Figure 10:
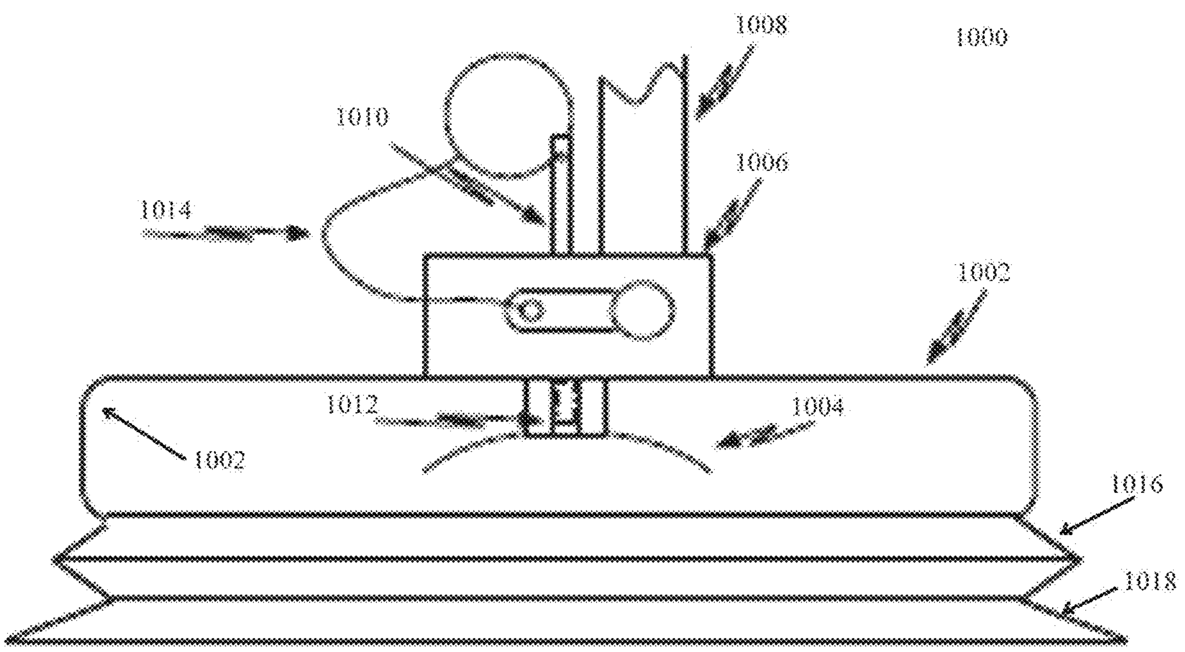
FIG. 10 is a diagram showing the assembled view of a swimming pool light leak detection device in which the single piece cover includes an integrated suction cup in accordance with some implementations.

FIG. 10 is a diagram showing full assembly swimming pool light leak detections device 1000 having a semi-rigid upper section 1002, an integrated suction cup 1004, an offset handle connection member 1006, a handle 1008, a suction cup vacuum release pin 1010 with suction cup vacuum release aperture 1012, a tether 1014 coupled to the suction cup vacuum release pin 1010, bellows 1016, and a double lip seal 1018.

Figure 11:
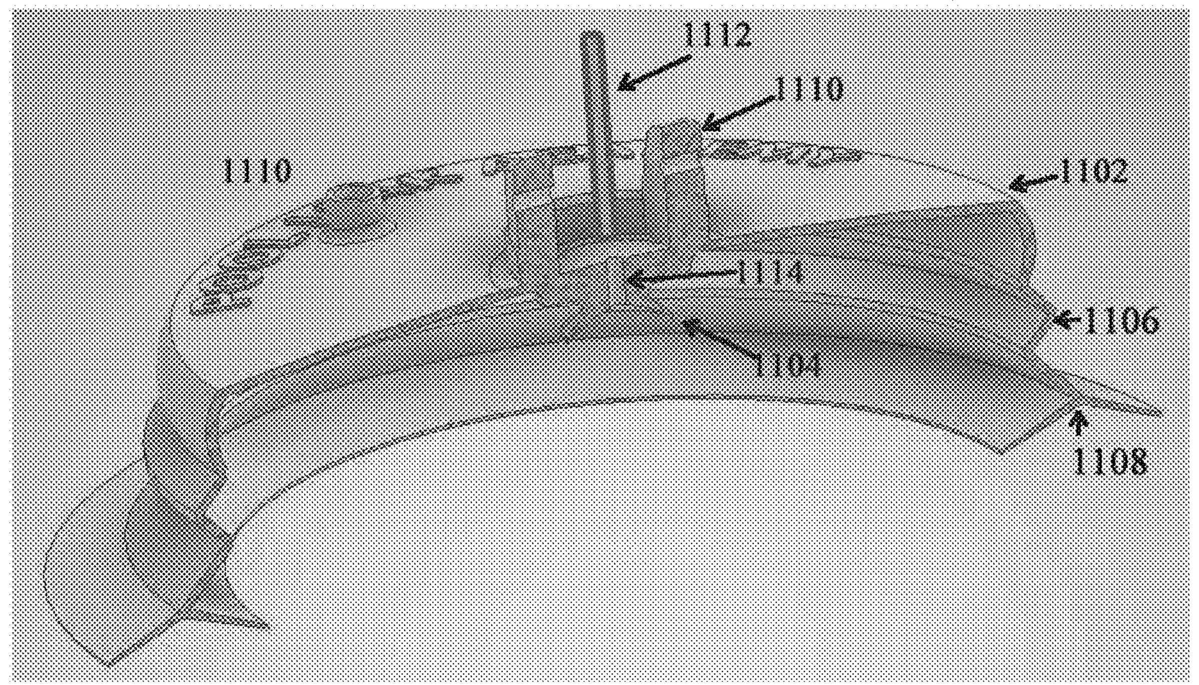
FIG. 11 is a diagram showing a cutaway view of a swimming pool light leak detection device in which the single piece cover includes an integrated suction cup in accordance with some implementations.

FIG. 11 is a cut away diagram of a side view of an example single piece swimming pool light leak detection device 1100 showing semi-rigid body 1102, integrated suction cup 1104, bellows 1106, double lip seal 1118, handle connection member 1110, suction cup vacuum release pin 1112, and suction cup vacuum release aperture 1114.

Figure 12:
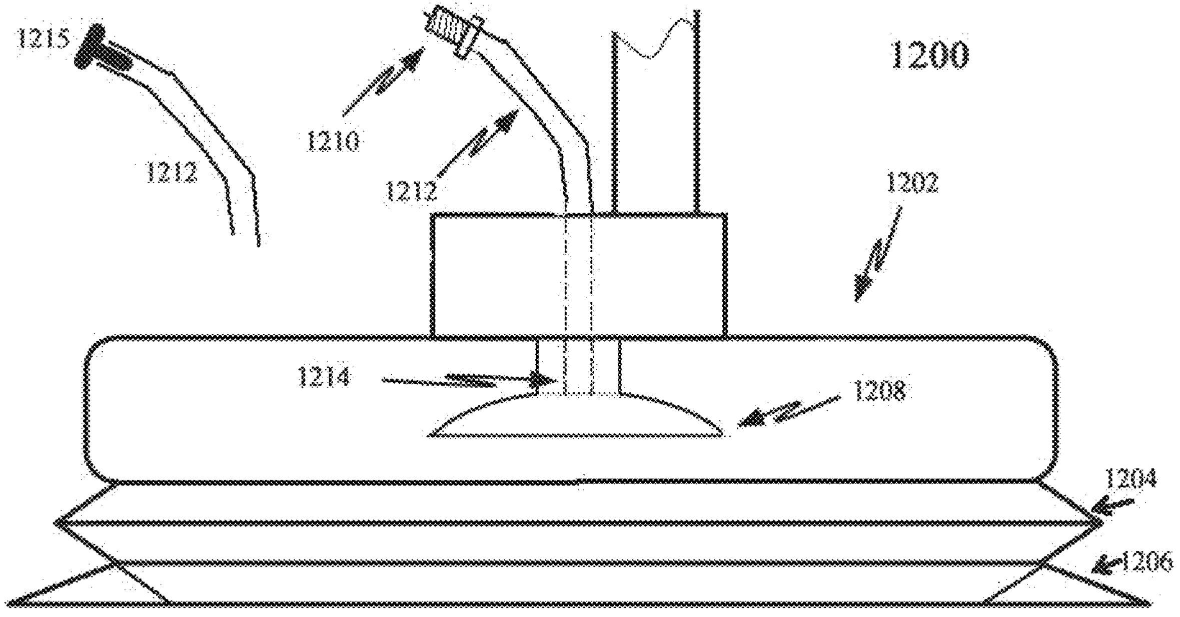
FIG. 12 is a diagram showing the side view of a swimming pool light leak detection device in which the single piece cover includes an integrated suction cup with an air valve vacuum release in accordance with some implementations.

FIG. 12 is a diagram of a side view of an example swimming pool light leak detection device 1200 having a single piece cover 1202 with integrated suction cup 1208. The single piece cover includes a semi-rigid upper portion 1202, a bellows 1204, and a double lip seal 1206.

FIG. 12 also shows an alternative suction cup vacuum release air valve 1210 attached to an air hose 1212 which is inserted into air valve hose port 1214. The difficult task of removing vacuum of the suction cup 1208 stuck to the glass light lens can not only be done with the pin being pulled from the aperture releasing the vacuum such as that shown in FIG. 7, but also with a common air valve (e.g., from a tire inner tube) 1210 attached to a hose 1212 penetrating through the suction cup via the air valve hose port 1214. In some implementations, a plug 1215 can be placed into the hose 1212 to seal the hose when a vacuum is being drawn and then to release the vacuum, the plug 1215 is removed from the hose 1212. In operation once the suction cup is attached, to release it a quick push on the needle valve releases the vacuum of the suction cup and the light cover is free to be removed.

Figure 13:
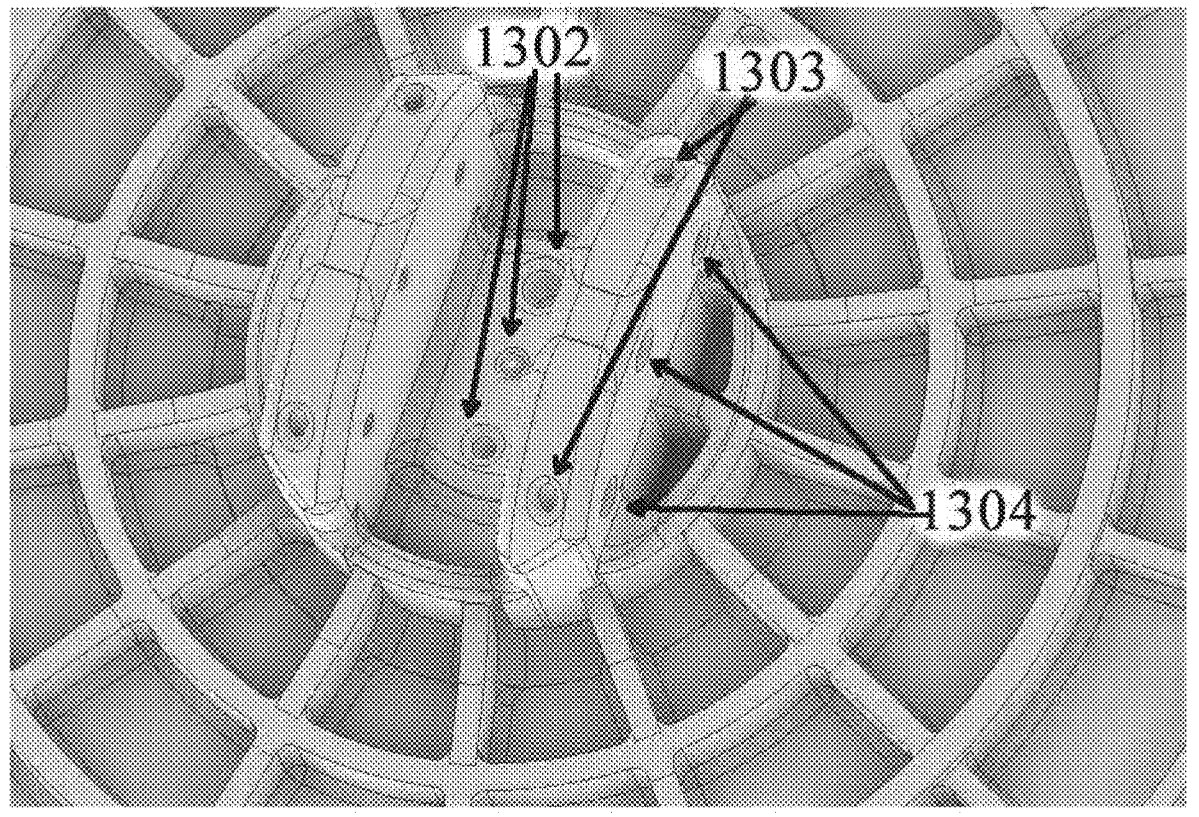
FIG. 13 is a diagram showing the top view of a swimming pool light leak detection device in which the single piece cover includes various apertures for an integrated suction cup light leak detection device in accordance with some implementations.

FIG. 13 is a top diagram of a swimming pool light leak detection device showing a polarity of apertures for use in with a handle offset from the center bolted with pins 1304. The vacuum suction cup vacuum release apertures 1302 will be easily accessed if the handle is shifted off center using off center bolt holes 1304. Also present are tandem handle apertures 1303 for joining in tandem more than one light or drain leak tester in accordance with some implementations.

Figure 14:
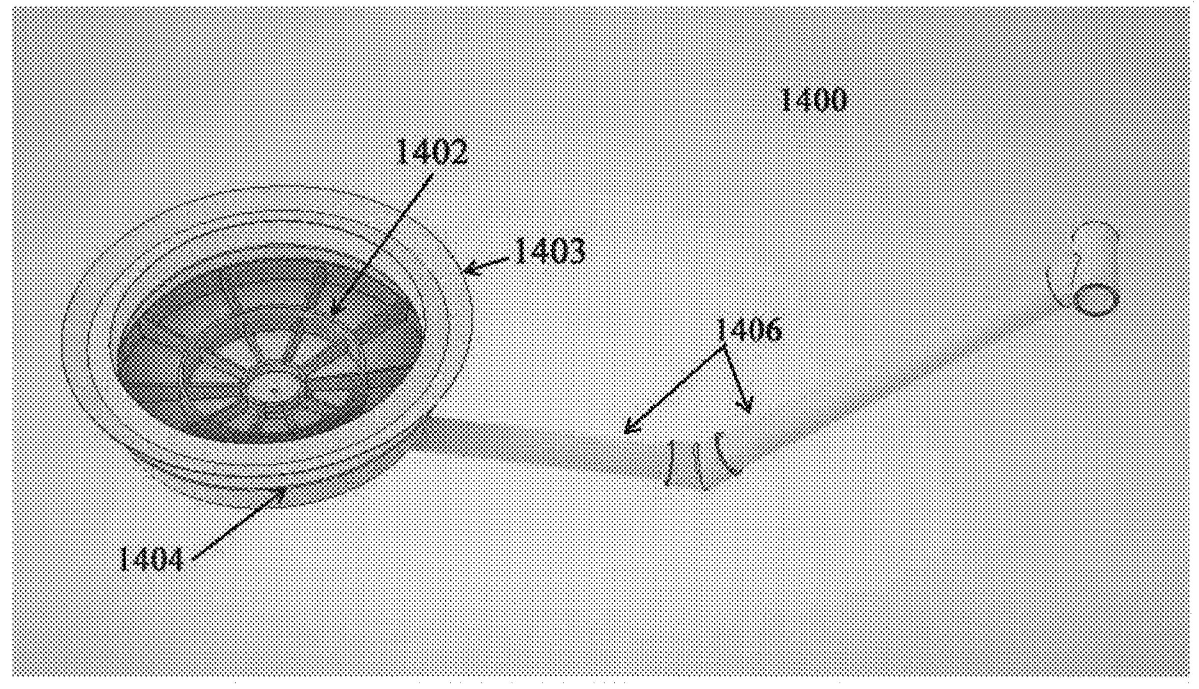
FIG. 14 is a diagram showing the bottom view of an assembled swimming pool light leak detection device in which the single piece cover includes a handle and a ring seat in accordance with some implementations.

FIG. 14 shows a bottom diagram of a light leak tester 1400 that uses a ring seat 1402 to stabilize the unit against the light instead of a suction cup. It is included on light tester implementations but could be included in a bottom drain model. Please understand a clear distinction between a ring seal and a ring seat: The ring seal 1403 would be the double lipped radial seal on the outside peripheral edge, where the ring seat 1402 is located radially inward from the ring seal. FIG. 14 also shows compound handle 1406 for added leverage when using the light leak tester or the bottom drain tester.

Figure 15:
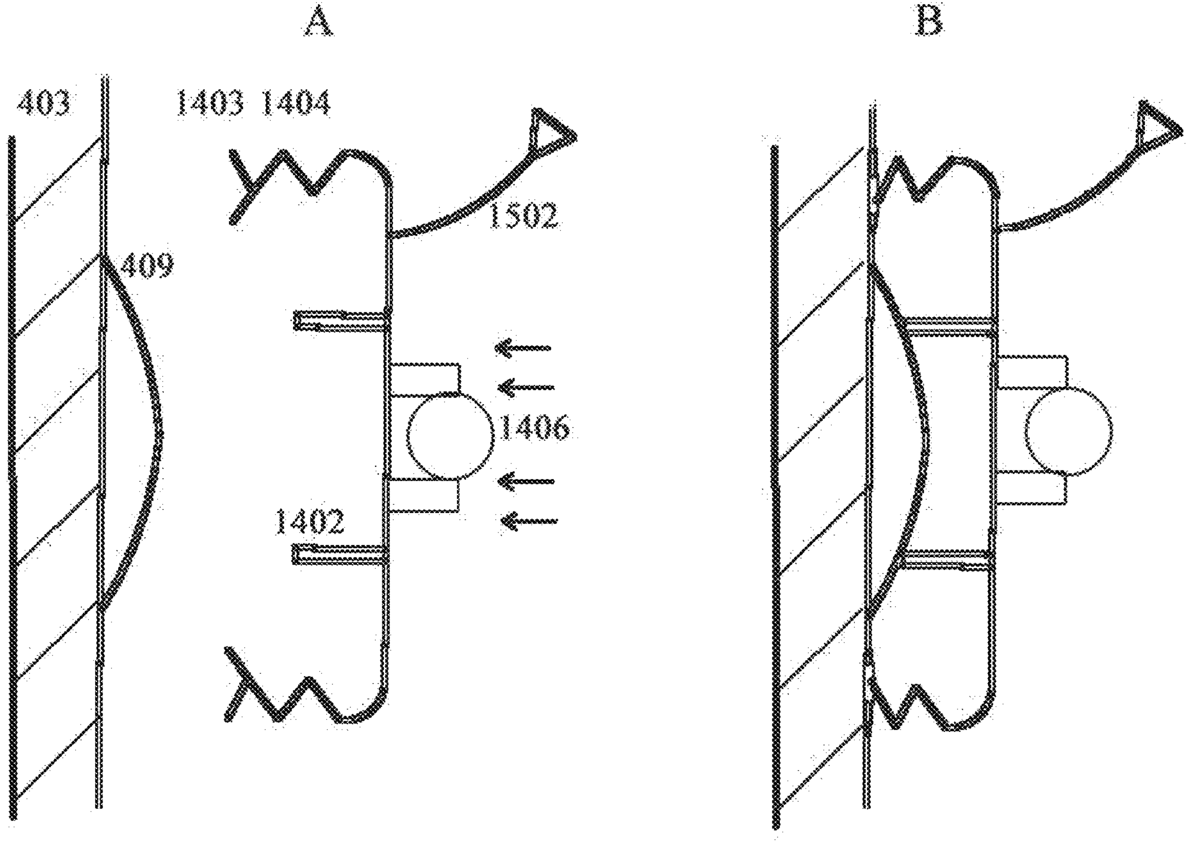
FIG. 15 is a side diagram showing the operational view (A) and (B) of a swimming pool light leak detection device in which the single piece cover includes a ring seat in accordance with some implementations.

FIG. 15 shows operational side views (A and B) of a light leak tester being compressed against a pool wall with compression travel being halted by the light ring seat 1402 that rests firmly on the light lens. The travel still allows the flexible accordion bellows 1404 and the double lipped perimeter ring seal 1403 to compress enough and seal the tester against the wall. This ring seat and ring seal can also be applied to bottom drains as we shall see.

Figure 16:
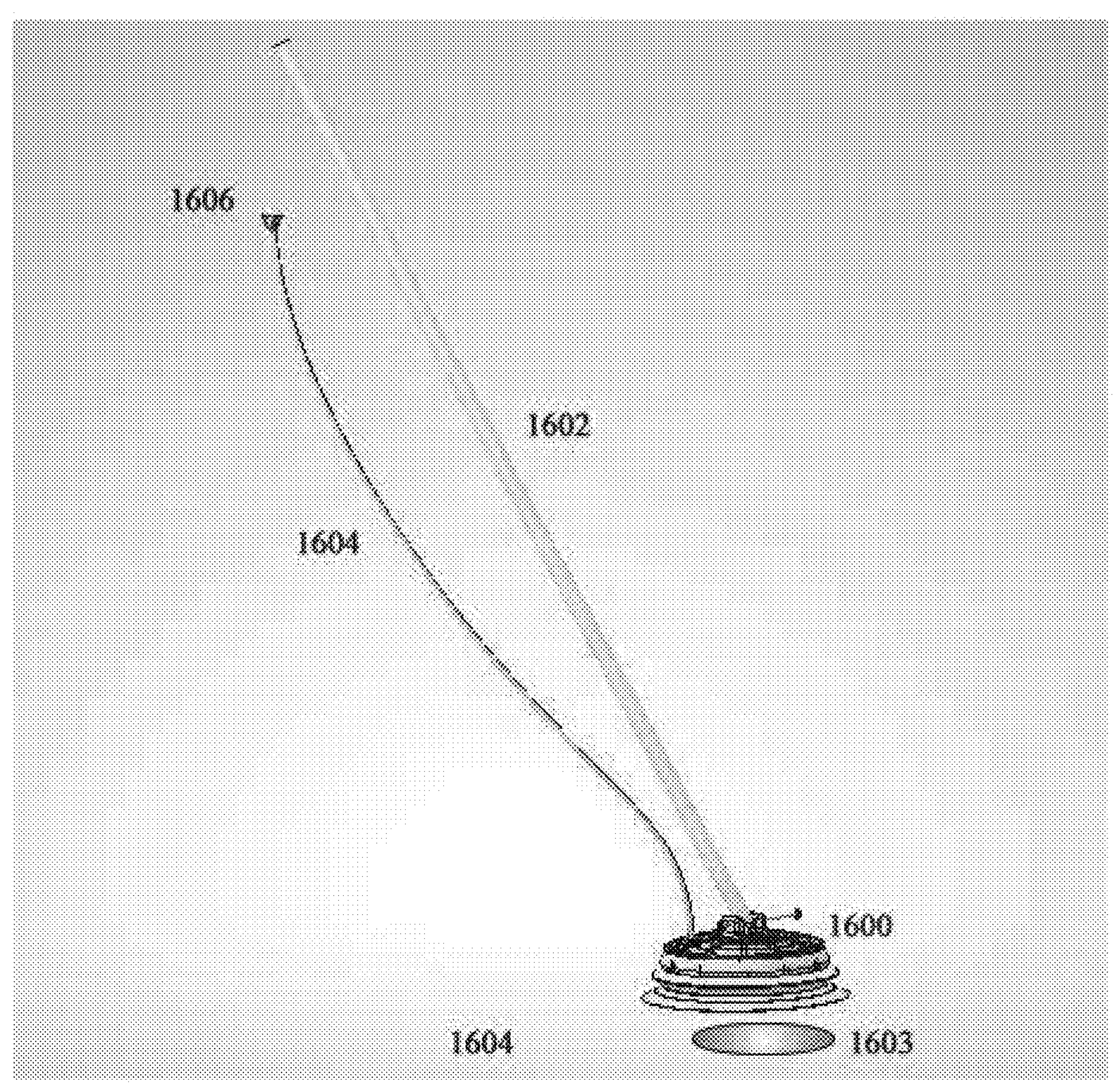
FIG. 16 is a diagram showing the full view of a swimming pool bottom drain leak detection device in which the single piece cover includes an attached swimming pool pole accordance with some implementations.

FIG. 16 shows a full view of a single piece bottom drain tester 1600 in route to cover a bottom drain 1603 for testing. Most bottom drains are located deep in the pool and a common swimming pool pole 1602 is used for the long reach to the drain. The dye funnel 1606 and extended testing tube 1604 also has the added reach for testing from the deck of the pool to the pool bottom or floor 1608.

Figure 17:
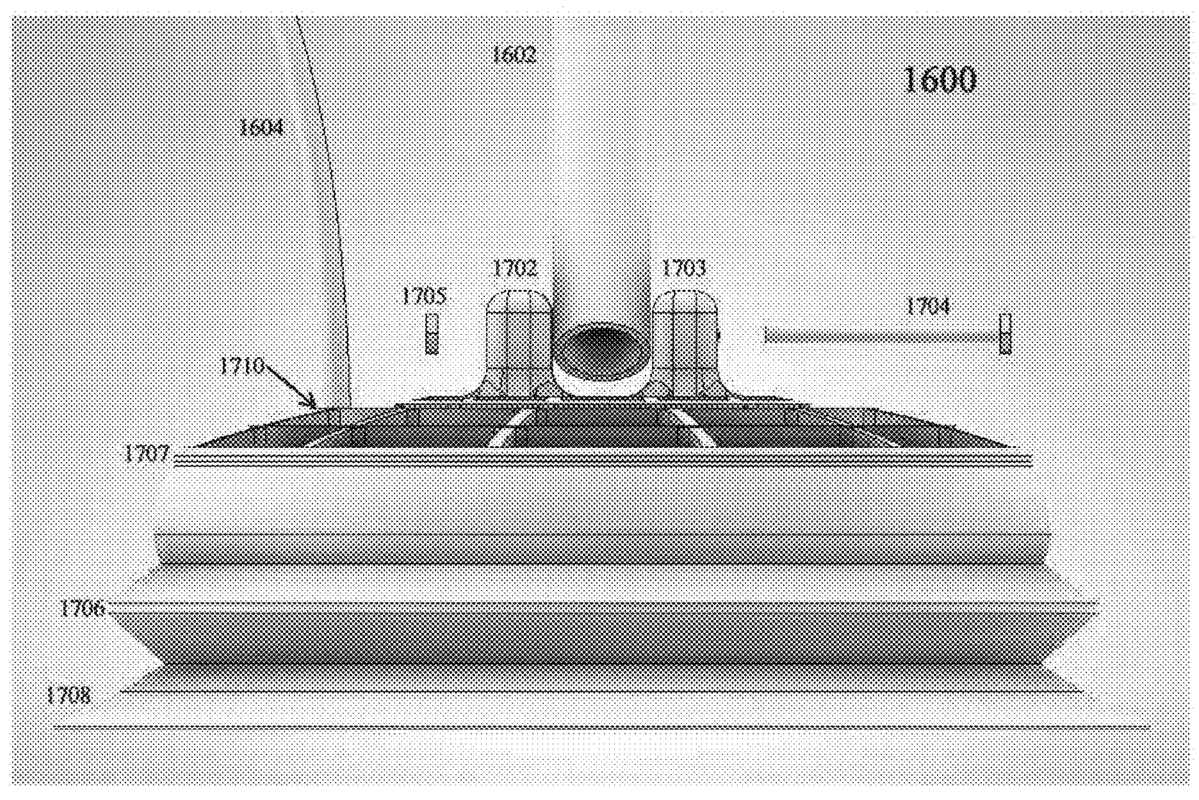
FIG. 17 is a diagram showing the side view of a swimming pool bottom drain leak detection device in which the single piece cover includes structural elements in accordance with some implementations.

FIG. 17 is a side view of the bottom drain leak tester 1600 with long bolt 1704 and nut 1705 attaching the tester to the pool pole 1602 through handle connectors 1702 and 1703. Also featured is the semi rigid cover 1707, the flexible accordion bellows 1706 and the double lip perimeter seal 1708. The extended dye testing tube 1604 is fitted into dye teste tube aperture 1710.

Figure 18:
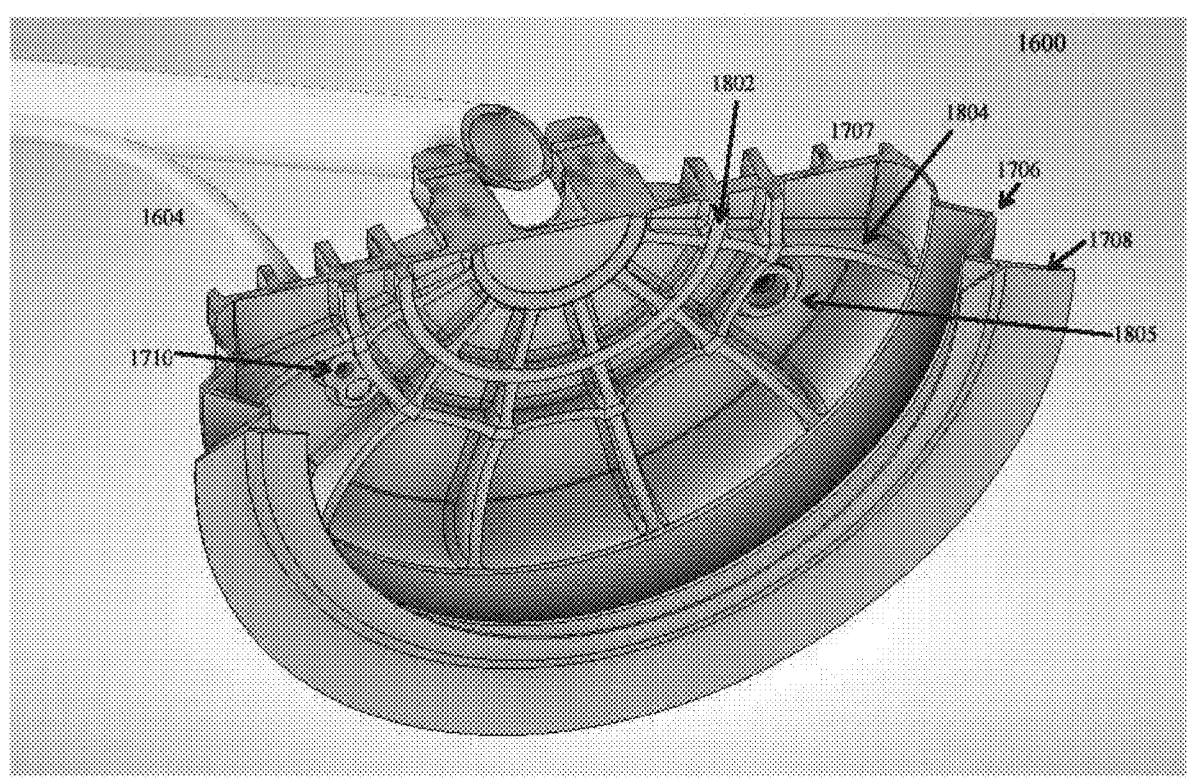
FIG. 18 is a diagram showing the assembled view of a swimming pool bottom drain leak detection device in which the single piece cover includes a ring seat, a flexible accordion bellows and a double lip perimeter seal in accordance with some implementations.

FIG. 18 is a cutaway perspective view of single piece bottom drain tester 1600 with semi ridged upper dome 1707 and reinforcing ribs 1709. The upper dome remains flexible but the real flexibility and mouldability against the pool wall comes from the flexible accordion bellows 1706 and the double lip perimeter seal 1708 which seals the dome against the pool floor 1605. The bottom drain leak tester also has the ring seat 1802 which rests firmly and stops forward movement of the drain tester against the bottom drain cover 1603. Once the tester is set in place against the drain cover, the leak is tested for by dye testing the extended tube 1604 through aperture 1804. There is also a hydrophone aperture 1805 for sonic testing of the bottom drain with an electronic listening instrument.

Figure 19:
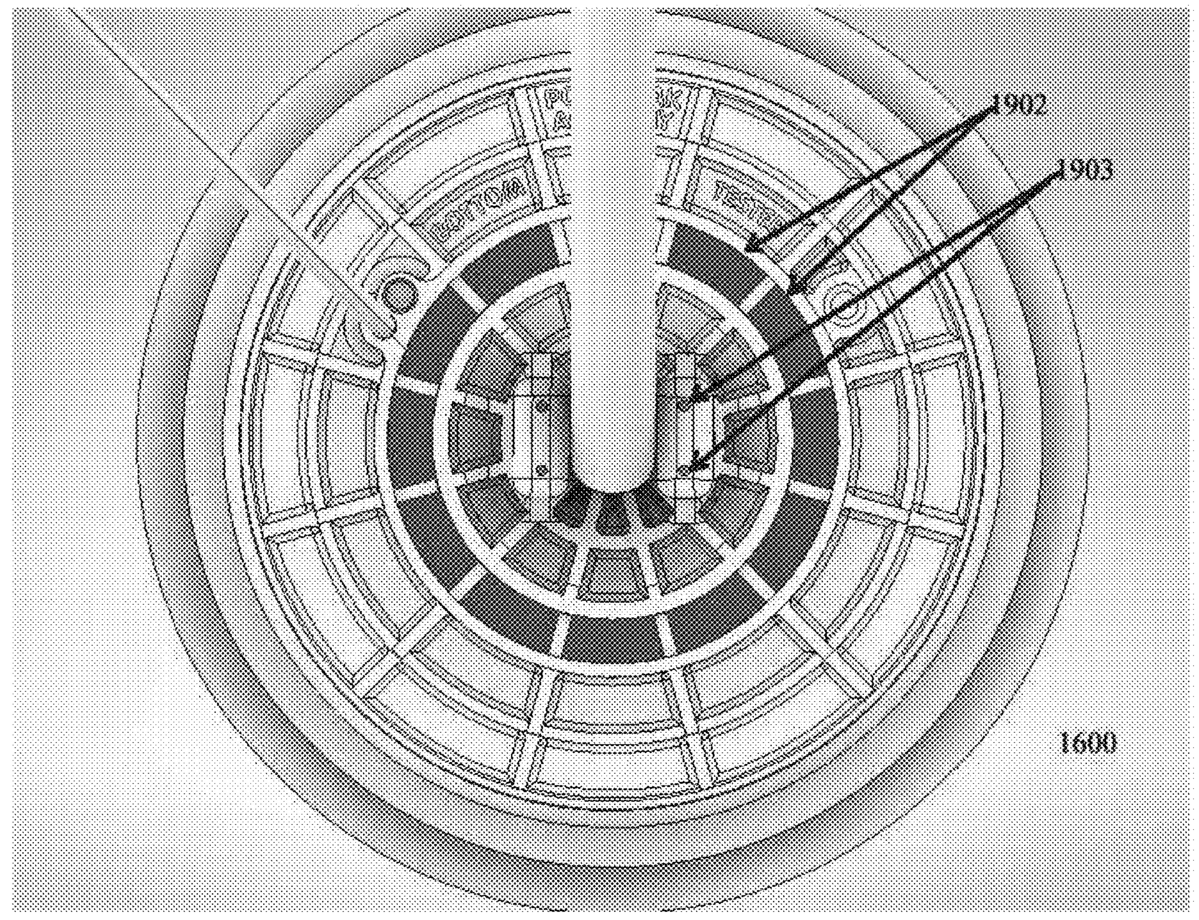
FIG. 19 is a diagram showing the assembled view of a swimming pool bottom drain leak detection device in which the single piece cover includes lead weights and apertures for a tandem connecting device in accordance with some implementations.

FIG. 19 is a top view of the bottom drain leak tester 1600 with the addition of integrated lead weights 1902 for ballast and apertures 1903 for tandem wire handles that will connect two or more bottom drain testers.

Figure 20:
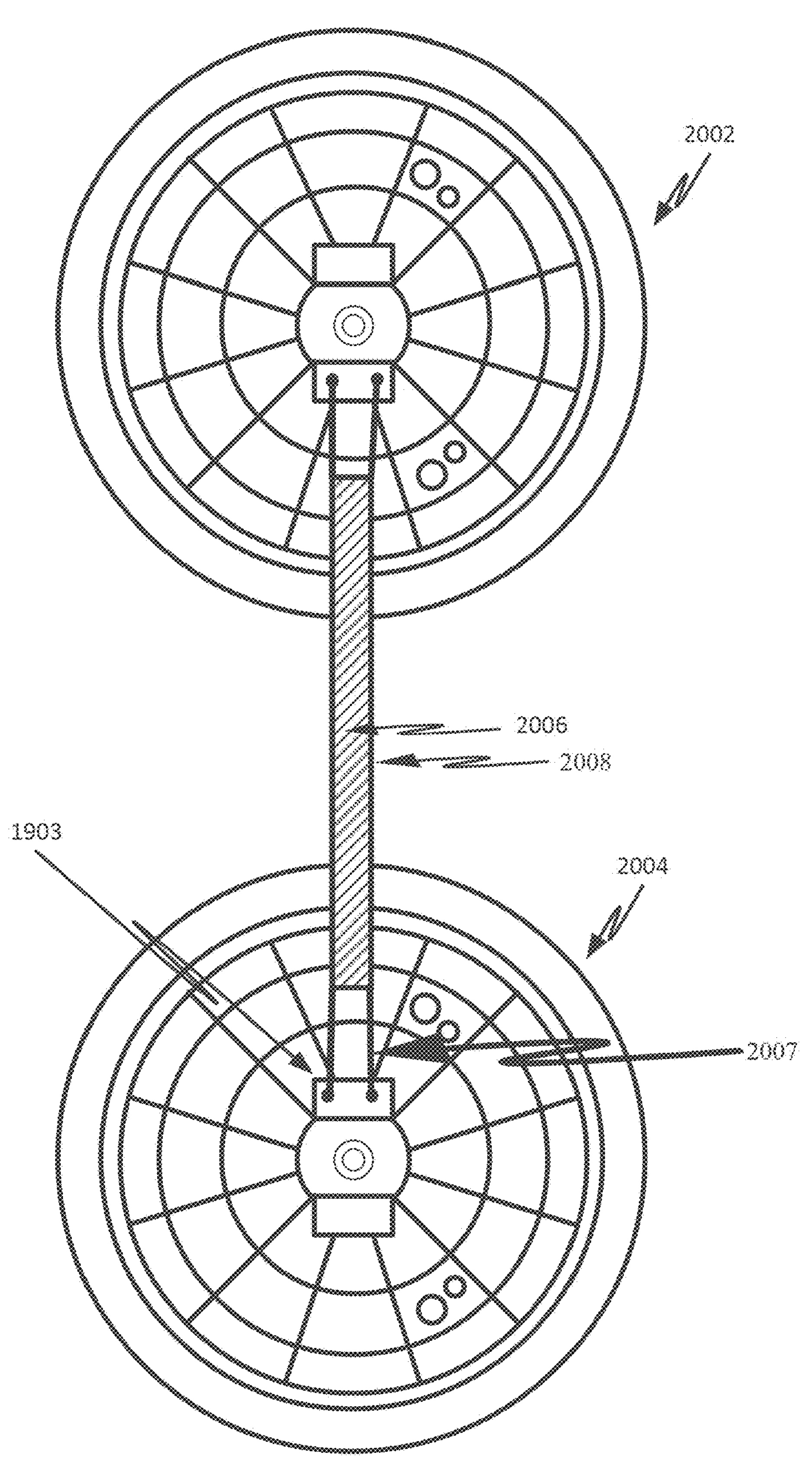
FIG. 20 is a diagram showing the assembled view of a swimming pool bottom drain leak detection device in which two single piece covers are attached in tandem by a connecting device in accordance with some implementations.

FIG. 20 is a top view of two drain testers connected in tandem with drain tester A 2002 and drain tester B 2004 being secured to each other with the drain connecting device 2006. The drain connection device can consist of two firm wires inside a flexible hose tube 2008. The end of said wires is bent as needed and terminates in the tandem wire handle connecting apertures 1903.

While some example implementations have been described in terms of a general embodiment with several specific example modifications, it is recognized that other modifications and variations of the embodiments described above are within the spirit and scope of the disclosed subject matter. Applicant intends to embrace any and all such modifications, variations and embodiments.

What is claimed is:

1. A swimming pool light leak detection device comprising:

- a single piece cover formed of a flexible material and having:
  - a semi-rigid central section, having a plurality of circular apertures;
  - an integrated suction cup formed on an interior surface of the single piece cover, wherein the suction cup includes a vacuum release aperture extending from an exterior side of the single piece cover to the interior of the cover through the integrated suction cup;
  - a first handle connection member;
  - a second handle connection member;
  - one or more reinforcing ribs; and
  - a double lip ring seal disposed at the perimeter of the single piece cover; and a flexible accordion bellows section disposed between the semi-rigid central section and the double lip seal;
  - wherein the single piece cover is constructed to fit around a swimming pool light and the double lip ring seal is constructed to form a seal between a wall of the swimming pool and the single piece cover such that a volume of water is enclosed within an interior space defined by the single piece cover and the wall.

2. The swimming pool light leak detection device of claim 1, further comprising:

- a vacuum release pin constructed to be insertable into the vacuum release aperture to seal the vacuum release aperture when inserted and to release a vacuum of the integrated suction cup when the vacuum release pin is removed from the vacuum release aperture, wherein the vacuum release pin is tethered to the single piece cover via a tether.

3. The swimming pool light leak detection device of claim 1, further comprising a vacuum release hose coupled on a first end to the vacuum release aperture and having at the second end a valve or plug to seal the vacuum release hose and to release the vacuum from the integrated suction cup when the valve is actuated, or the plug is removed.

4. The swimming pool light leak detection device of claim 1, further comprising a ring seat formed on an interior surface of the single piece cover.

5. The swimming pool light leak detection device of claim 1, wherein the first handle connection member and the second connection member are constructed to connect a handle to the single piece cover, wherein, when the handle is connected to the single piece cover, the handle is offset from a center of the single piece cover.

6. The swimming pool light leak detection device of claim 1, wherein the first handle connection member and the second connection member are constructed to connect a handle to the single piece cover, wherein, when the handle is connected to the single piece cover, the handle is disposed at a center of the single piece cover.

7. The swimming pool light leak detection device of claim 1, wherein at least one of the circular apertures is constructed to receive a hydrophone.

8. The swimming pool light leak detection device of claim 1, wherein at least one of the circular apertures is constructed to receive a dye injection hose, wherein the dye injection hose includes a funnel coupled to a distal end of the dye injection hose.

9. The swimming pool light leak detection device of claim 1, further comprising a handle.

10. The swimming pool light leak detection device of claim 9, wherein the handle includes an angle formed between a proximate end of the handle connected to the single piece cover and a distal end of the handle, wherein the distal end of the handle includes a floatation member.

11. A swimming pool drain leak detection device comprising:

- a single piece cover formed of a flexible material and having:
  - a semi-rigid central section, having a plurality of circular apertures;
  - a first handle connection member;
  - a second handle connection member;
  - one or more reinforcing ribs;
  - a double lip seal disposed at the perimeter of the single piece cover;
  - a flexible accordion bellows section disposed between the semi-rigid central section and the double lip seal; and
  - a ring seat formed on an interior surface of the single piece cover, wherein the single piece cover is constructed to fit around a swimming pool drain, wherein the double lip seal is constructed to form a seal between the bottom of the swimming pool and the single piece cover such that a volume of water is enclosed within an interior space defined by the single piece cover and the bottom of the swimming pool, and wherein the ring seat is configured to support the single piece cover and prevent the single piece cover from collapsing on the swimming pool drain.

12. The swimming pool drain leak detection device of claim 11, wherein the first handle connection member and the second connection member are constructed to connect a handle to the single piece cover, wherein, when the handle is connected to the single piece cover, the handle is offset from a center of the single piece cover.

13. The swimming pool drain leak detection device of claim 11, wherein the first handle connection member and the second connection member are constructed to connect a handle to the single piece cover, wherein, when the handle is connected to the single piece cover, the handle is disposed at a center of the single piece cover.

14. The swimming pool drain leak detection device of claim 11, wherein at least one of the circular apertures is constructed to receive a hydrophone, and wherein at least one of the circular apertures is constructed to receive a dye injection hose.

15. The swimming pool drain leak detection device of claim 11, further comprising a handle, wherein the handle includes an extended swimming pool pole operated from the deck of the pool.

16. The swimming pool drain leak detection device of claim 15, wherein the handle includes an angle formed between a proximate end of the handle connected to the single piece cover and a distal end of the handle, wherein the distal end of the handle includes a floatation member.

17. The swimming pool drain leak detection device of claim 11, further comprising one or more weights inserted into cavities formed on a top exterior surface of the single piece cover.

18. The swimming pool drain leak detection device of claim 11, wherein the first handle connection member and the second handle connection member include at least one aperture formed on a side of the first handle connection member and the second connection member for connecting a handle to the single piece cover.

19. The swimming pool drain leak detection device of claim 11, wherein the first handle connection member and the second handle connection member include a plurality of linking apertures formed on a top surface of each of the first handle connection member and the second handle connection member, wherein the linking apertures are configured to receive a connecting member that connects the swimming pool drain leak detection device to another swimming pool drain leak detection device to cover dual swimming pool drains.

20. The swimming pool drain leak detection device of claim 19, further comprising the connecting member.

* * * * *